S. H. ASHMUN.
BERRY BOX.
APPLICATION FILED JULY 11, 1908.
922,659.
Patented May 25, 1909.
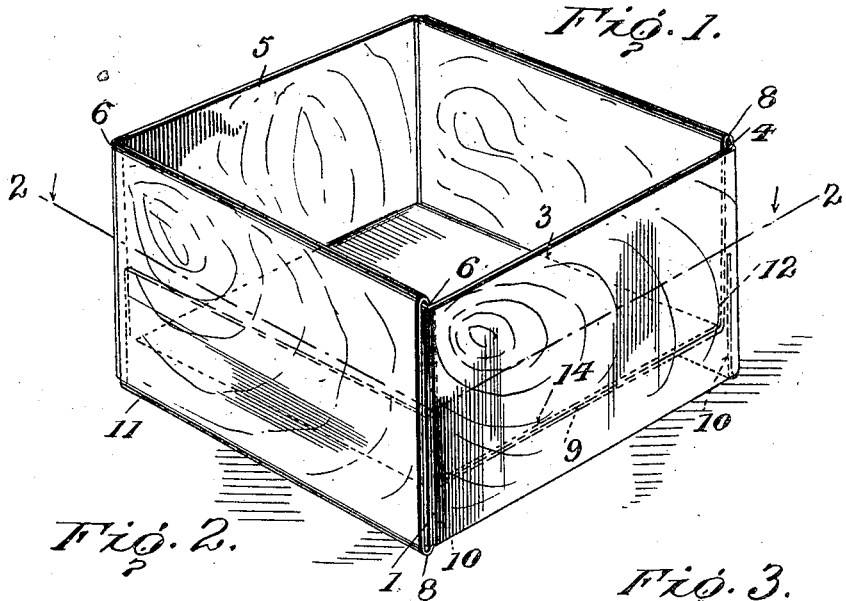
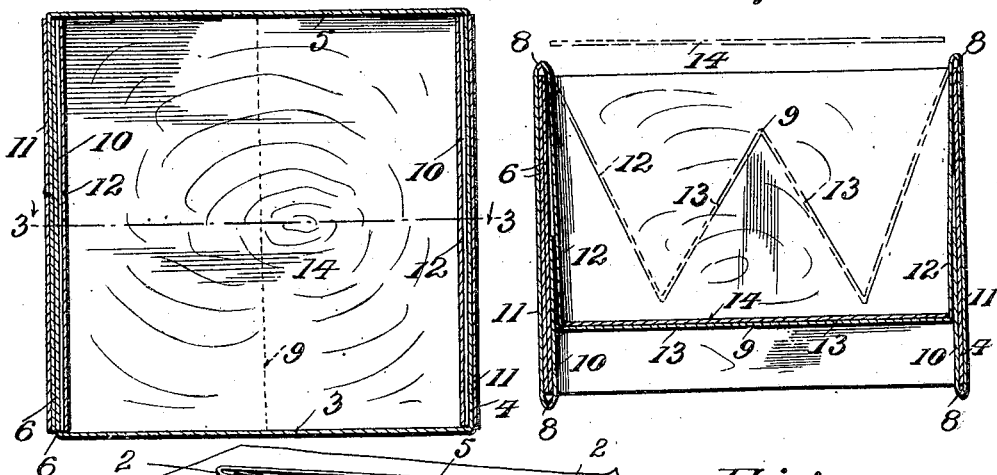
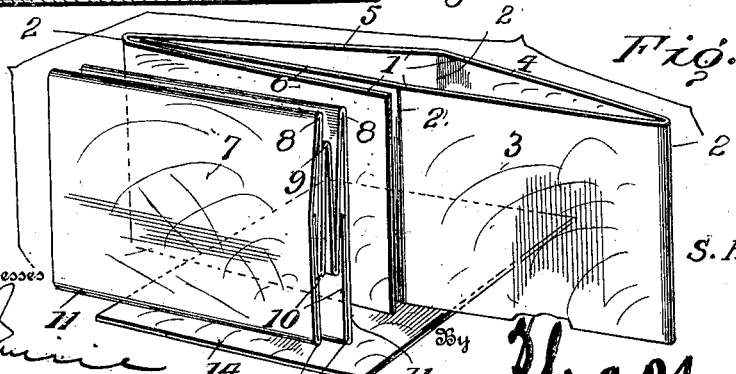
Inventor
S. H. Ashmun
Witnesses
By Ira Macy, Attorneys

UNITED STATES PATENT OFFICE.

SILAS H. ASHMUN, OF HOQUIAM, WASHINGTON.

BERRY-BOX.

No. 922,659.    Specification of Letters Patent.    Patented May 25, 1909.

Application filed July 11, 1908. Serial No. 443,035.

*To all whom it may concern:*

Be it known that I, SILAS H. ASHMUN, citizen of the United States, residing at Hoquiam, in the county of Chehalis and State of Washington, have invented certain new and useful Improvements in Berry-Boxes, of which the following is a specification.

This invention relates to fruit boxes and particularly of that type known as berry boxes.

Heretofore it has been the common custom to make the smaller fruit and berry boxes out of thin wood strips, and in some cases out of card-board and secure the various parts of the same together in a rigid manner. Some of the boxes of this type have been formed with tapering sides so that a large number of boxes could be nested together; and others have been formed with square sides. The latter type of boxes are found to have more advantages in many respects, and to be manufactured, and handled with less difficulty than the tapering type.

The growth of the small fruit industries has produced a vital demand for a cheap and efficient box for holding berries and like fruits, which will stand the hard usage of shipment and keep fruit in a proper condition. In the shipment and movement of fruits the smaller boxes are sometimes inclosed in crates and sometimes stacked on the ground in tiers, often without any support. This stacking of filled boxes, one on top the other, often causes the lower boxes to give way under the strain of the weight of the upper boxes. As a result, there is a growing demand for a box which will stand the usage of rapid and often frequent movement and be able to bear unusual weights. In the folding boxes heretofore produced, it has been found that the boxes will break down under strain caused by stacking.

This invention comprehends the construction of a berry or fruit box that will withstand unusual weights and which can be formed and used without the aid of metal stays, gluing or sewing, and which may be readily set up or knocked down.

The box of my invention is made of two main parts, and is formed out of material common to the art.

This invention further comprehends a method of joining the formed parts so that they are securely locked together in such a manner that the weight of fruit will force the parts together.

My invention particularly comprises the constructions, combinations and arrangements of parts shown in the accompanying drawings and particularly pointed out in the specification and claims.

For a full understanding of the invention, reference is to be had to the following description and accompanying drawings, in which:

Figure 1 is a perspective view of a completed box, Fig. 2 is a horizontal sectional view taken on the line 2—2 of Fig. 1, Fig. 3 is a vertical sectional view taken on the line 3—3 of Fig. 2, and Fig. 4 is a perspective view showing the various parts of my improved box ready to be joined into a completed box.

Corresponding and like parts are referred to in the following description and indicated in all the views of the drawings by the same reference characters.

In the drawings, numeral 1 designates a box section forming the sides of my improved fruit box. This section is formed with a plurality of score lines 2, so as to produce sides 3, 4, 5 and 6, 6, the last mentioned sides being adapted to overlap each other so as to form a single main side.

Numeral 7 designates a box section formed with a plurality of creases or score lines 8, and a middle score or crease line 9. The box section 7, when formed with designated creases or score lines, is then provided with end flaps 10, box side flaps 11, inner flaps 12, and a creased or scored section 13 which constitutes the folding bottom of my improved box. When the two box sections are properly creased or scored, they may be joined together by bringing the ends or sides 6—6 of the section 1 together so that they overlap each other, and then placing the end flaps 10 of the section 7 at the inner walls of the sides 4 and 6 of section 1, the latter being in substantially rectangular condition during this operation. The side portions 11 of the section 7 should extend upwardly along the exterior walls of the sides 6 and 4 of the section 1, while the bottom portion 13 is at first substantially of W-shape as indicated in Fig. 3, the crease 9 permitting this initial formation. The bottom portion 13 is then forced downwardly so that the inner side flaps 12 of the section 7 are forced against the end flaps 10 so as to hold said end flaps 10 securely in place, the bottom portion 13 being straightened out in this operation as indicated in the full lines in Fig. 3 and the removable section 14 being finally placed on the bottom of the portion 13 to hold the parts securely locked together.

It will be noted that when the box sections are joined together so as to complete the fruit or berry box as illustrated in Fig. 1, that the outer side parts 11, will be slightly wider than box section 1. This feature of my improved box is an important one, as it gives the complete box greater strength and enables the different parts of the box to be joined together, and when joined, will be frictionally locked in placed.

It is a common practice in the art, to stack boxes in tiers, and often when boxes of a class to which this belongs, are filled with fruit of various kinds, they are so stacked that the lower boxes often break down under the strain, thus causing injury and loss. Owing to the peculiar construction of the box sections comprising my improved box and the manner in which they are joined together, the weight of the boxes filled with fruit, will so bear upon the various parts as to substantially strengthen the same. By reason of the greater width of the outside section 11 over inside section 12, the weight received from boxes filled with fruit and arranged in tiers, will be received by these sides instead of by the fruit or of the box sides proper.

From the construction of my improved berry or fruit box, it is possible to manufacture and ship large quantities of boxes in a knocked down condition to the buyers of such boxes and when received by them to be quickly set in an upright condition for market use. Owing to the construction of various parts comprising my box and the manner of joining the same together, it is not necessary to employ glue or use metal or other stays to hold the box in shape when it is set in an upright position. The importance of this feature cannot be over estimated as it enables shippers of fruit to buy their blank boxes of parts in large quantities before the fruit seasons and to place the same in a usable condition with out the aid of expensive and complicated machinery. Another feature is that the box is so constructed that it may be repeatedly used, the construction of the box being such that it is as easy to fold the box parts to their original shape, as it is to join the various parts together in an upright position.

What I claim and desire to secure by Letters Patent is:

1. A box of the character described, comprising a section constructed of one strip of material embodying upright sides, and a second section also constructed of a single strip of material provided with score lines producing an intermediate bottom portion, two adjacent portions extending along the inner walls of the two opposite sides of the first named section, outer portions joined to said last named portions, and extending along the outer walls of said sides, and end flaps folding inwardly around the bottom edges of said sides between said sides and the adjacent portions of the second named section, the bottom portion of such section being formed with score lines intermediate of its side edges, whereby it may be doubled upon itself, and means for holding the bottom section against such folding movement.

2. A box of the character described, comprising a section constructed of one strip of material embodying upright sides, and a second section also constructed of a single strip of material provided with score lines producing an intermediate bottom portion, two adjacent portions extending along the inner walls of the two opposite sides of the first named section, outer portions joined to said last named portions, and extending along the outer walls of said sides, and end flaps folding inwardly and around the bottom edges of said sides between said sides and the adjacent portions of the second named section, the bottom portion of such section being formed with a score line intermediate of its side edges whereby it may be doubled upon itself, and a removable bottom section coacting with the bottom portion of the second named box section, and inserted within said section, and lying upon said bottom portion whereby to hold said bottom portion in straight condition against such folding movement.

In testimony whereof I affix my signature in presence of two witnesses.

SILAS H. ASHMUN.

Witnesses:
A. S. HODGDON,
A. M. DINEEN.